United States Patent [19]

Snodgrass

[11] 4,186,907
[45] Feb. 5, 1980

[54] NON-WEIGHT FISHING BAIT CASTER

[76] Inventor: Bert L. Snodgrass, Rte. 2, Box 2443, Selah, Wash. 98942

[21] Appl. No.: 24,473

[22] Filed: Mar. 26, 1979

[51] Int. Cl.² ............................................. B22D 5/00
[52] U.S. Cl. ..................................... 249/94; 43/43.12
[58] Field of Search ......................... 249/94; 43/43.12

[56] References Cited

U.S. PATENT DOCUMENTS

| 695,027 | 3/1902 | Berry | 249/94 |
|---|---|---|---|
| 3,391,482 | 7/1968 | Benoit | 43/43.12 |

FOREIGN PATENT DOCUMENTS 1054574  10/1953  France .................................. 43/43.12

Primary Examiner—William E. Schulz

[57] ABSTRACT

This fishing bait caster enables a fisherman, using a spinning rod and reel, to cast his line fifty feet, without having lead weights attached, and it consists primarily of a ball of ice, which has, frozen therein, a rubber band for attachment to a snap-swivel. The ball of ice, when cast out into the water, first acts as a bobber, and, in a short period of time, melts, thus allowing the bait to settle to the bottom naturally, which will enable a fisherman to catch more fish, get more fight from the fish, and lose less hooks.

4 Claims, 4 Drawing Figures

NON-WEIGHT FISHING BAIT CASTER

This invention relates to fishing tackle, and more particularly, to a non-weight fishing bait caster.

It is, therefore, the principal object of this invention to provide a non-weight fishing bait caster, which will be used by a fisherman using a spinning rod and reel, to cast his line fifty to one hundred and fifty feet, without having lead weights attached thereto.

Another object of this invention is to provide a non-weight fishing bait caster, which will be made of ice, that, when cast into the water, will first act as a bobber on the water, and, after a short period of time, will melt and enable the bait to settle to the bottom of the water naturally, thus enabling the fisherman to catch more fish, get more fight from the fish and loose less hooks.

A further object of this invention is to provide a non-weight fishing bait caster, which will be water frozen in the compartments of an ice tray, having openings in the top for a rubber band to protrude, and the rubber band will serve as resilent means for attaching the frozen bait caster to the fishing line by using a snap-swivel that is common in the art.

Other objects of the invention, are to provide a non-weight fishing bait caster, which will be simple in design, inexpensive to make, and efficient in use.

These, and other objects, will be readily understood, upon a study of the following specification and the accompanying drawing, in which.

Figure 1:
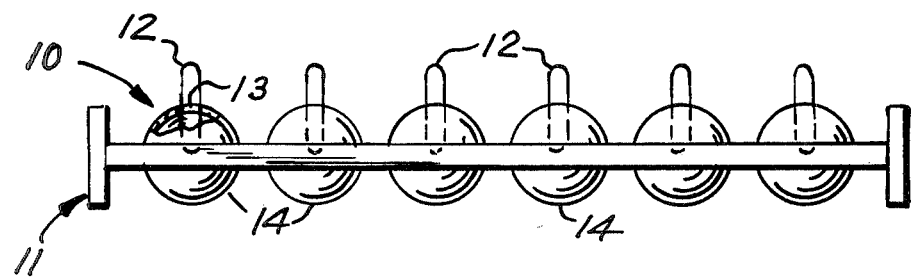
FIG. 1 is a side view of an ice tray, shown in elevation and partly broken away, illustrating the present invention as they are formed in plurality.
Figure 2:
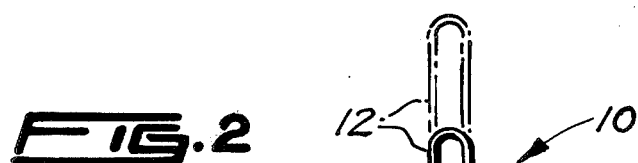
FIG. 2 is an enlarged plan view of one of the bait casters, shown removed from the tray and ready for use, and illustrates the stretched position of the embedded rubber band, in phantom.

According to this invention, a fishing bait caster 10 is shown to be frozen formed in an ice tray 11 of conventional configuration. A rubber band 12 is placed in the openings 13 of the compartments 14, so as to depend downwards, partially to the center, when compartments 14 are filled with water. When the tray 11 is placed in the freezer of a refrigerator, it freezes the water into individual bait casters 10, which are ice 15, and the protruding rubber band 12, frozen therein, is secured to the fisherman's line (not shown) by means of a common snap-swivel.

Figure 3:
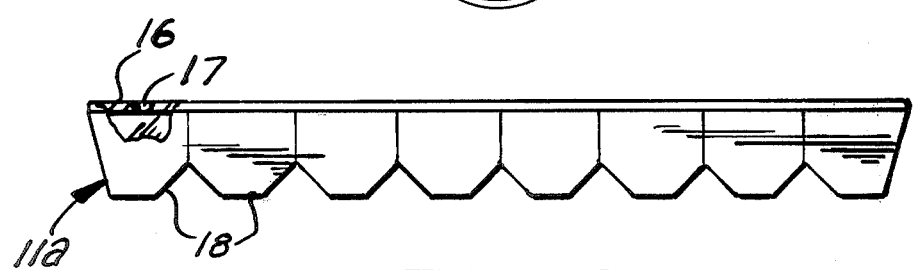
FIG. 3 is a side elevational view of a modified tray, shown partly broken away.
Figure 4:
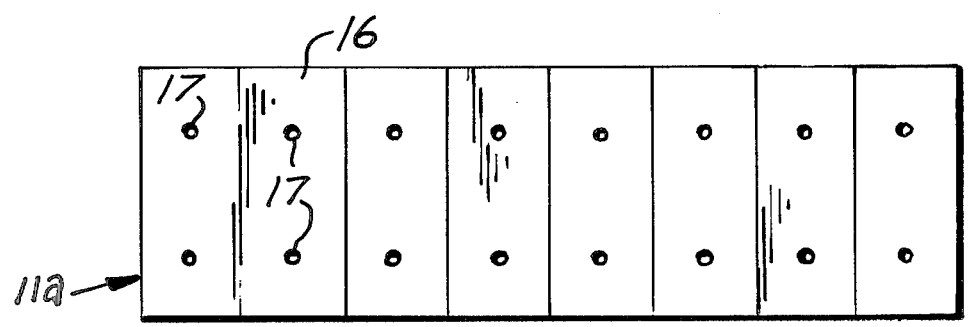
FIG. 4 is a top plan view of FIG. 3.

Looking now at FIGS. 3 and 4, a modified tray 11a is shown to include a rectangular cover 16, having an opening 17 therethrough, over each of the compartments 18 for receiving a rubber band 12, in the same manner as heretofore described of FIG. 1, and the product frozen in tray 11a is different in shape, but is used in the same manner as bait caster 10.

While various changes may be made in the detail construction, such changes will be within the spirit and scope of the present invention as is defined by the appended claims:

What I now claim is:

1. A set for making a non-weight fishing bait caster, comprising, in combination, a tray with a plurality of compartments for receiving water to be frozen, and a cover removably received an said tray for supporting and confining a plurality of rubber bands, and rubber bands which will be frozen in each of the non-weight fishing bait casters.

2. The combination according to claim 1, wherein said cover includes a plurality of spaced-apart openings, each being disposed over one of the said plurality of compartments, and each of the openings confines a rubber band in support in water of the said plurality of compartments.

3. The combination according to claim 2, wherein the water in said tray, when frozen by a freezing means, forms a plurality of said non-weight fishing bait casters, and the said rubber bands are fixedly secured in the ice body by the freezing means.

4. The combination according to claim 3, wherein the said rubber bands are removably received on common snap-swivels, which are secured to a fishing line.

* * * * *